US012018616B2

United States Patent
Jarvo et al.

(10) Patent No.: US 12,018,616 B2
(45) Date of Patent: Jun. 25, 2024

(54) SYSTEMS AND METHODS FOR PURGING A FUEL MANIFOLD OF A GAS TURBINE ENGINE

(71) Applicant: PRATT & WHITNEY CANADA CORP., Longueuil (CA)

(72) Inventors: James Robert Jarvo, Saint-Bruno-de-Montarville (CA); Cédric Saintignan, Boucherville (CA); Hytham Mokhtar, Pointe-Claire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/983,595

(22) Filed: Nov. 9, 2022

(65) Prior Publication Data

US 2024/0151183 A1 May 9, 2024

Related U.S. Application Data

(62) Division of application No. 17/061,856, filed on Oct. 2, 2020, now Pat. No. 11,525,410.

(Continued)

(51) Int. Cl.
*F02C 7/232* (2006.01)
*F02C 7/22* (2006.01)

(52) U.S. Cl.
CPC .............. *F02C 7/232* (2013.01); *F02C 7/222* (2013.01); *F05D 2220/323* (2013.01); *F05D 2240/35* (2013.01)

(58) Field of Classification Search
CPC ........... F23D 2209/30; F05D 2260/601; F05D 2260/602; F02C 7/228
See application file for complete search history.

(56) References Cited

U.S. PATENT DOCUMENTS 2,712,218 A 7/1955 Ritter
3,901,025 A 8/1975 Bryerton et al.
(Continued)

FOREIGN PATENT DOCUMENTS

EP 2511499 A2 10/2012
EP 2778372 A2 9/2014

OTHER PUBLICATIONS

European Patent Office, Communication re. partial European search report re. European Patent Application No. 20201405.6-1007, dated Feb. 11, 2021.

(Continued)

*Primary Examiner* — Gerald L Sung
(74) *Attorney, Agent, or Firm* — Norton Rose Fulbright Canada LLP (57) ABSTRACT

Fuel systems of gas turbine engines of aircraft, and associated methods are provided. The fuel systems and methods can permit reverse purging of one or more fuel manifolds of a gas turbine engine to prevent coking in some modes of operation. A fuel system includes first and second fuel manifolds fluidly connectable to a combustor of the gas turbine engine. A valve is operatively disposed between the second fuel manifold and a fuel supply line for controlling fuel supply to the second fuel manifold. A reservoir includes a movable piston disposed therein and dividing the reservoir into a first chamber and a second chamber. The first chamber is fluidly connectable to the fuel supply line or to a fuel purge line via the valve. The second chamber is in fluid communication with the second fuel manifold to receive residual fuel from the second fuel manifold.

3 Claims, 8 Drawing Sheets

Related U.S. Application Data (60) Provisional application No. 62/913,345, filed on Oct. 10, 2019.

(56) References Cited

U.S. PATENT DOCUMENTS

| | | |
|---|---|---|
| 6,442,925 B1 | 9/2002 | Dalton et al. |
| 7,093,420 B2 | 8/2006 | Futa, Jr. et al. |
| 8,083,204 B2 | 12/2011 | Maker |
| 8,429,892 B2 | 4/2013 | Tentorio |
| 8,567,201 B2 | 10/2013 | Dalton |
| 9,447,733 B2 | 9/2016 | Belleville |
| 9,982,602 B2 | 5/2018 | Carpenter et al. |
| 10,094,298 B2 | 10/2018 | Ramos et al. |
| 2003/0110775 A1 | 6/2003 | Wernberg |
| 2003/0233823 A1 | 12/2003 | Futa et al. |
| 2005/0279079 A1 | 12/2005 | Baryshnikov et al. |
| 2020/0049025 A1 | 2/2020 | Morgan et al. |
| 2021/0062714 A1 | 3/2021 | Tarling et al. |

OTHER PUBLICATIONS

European Patent Office, Communication re. European search report for European Patent Application No. 20201405.6-1007, dated Jun. 29, 2021.

SYSTEMS AND METHODS FOR PURGING A FUEL MANIFOLD OF A GAS TURBINE ENGINE

CROSS-REFERENCE TO RELATED APPLICATIONS

This application is a division of U.S. application Ser. No. 17/061,856 filed on Oct. 2, 2020 and incorporated herein by reference, which claims priority to U.S. application No. 62/913,345 filed on Oct. 10, 2019, the entire contents of which are incorporated by reference herein.

TECHNICAL FIELD

The disclosure relates generally to gas turbine engines, and more particularly to the operation of gas turbine engines at low power conditions.

BACKGROUND OF THE ART

Twin-engine helicopters are provided with two turboshaft gas turbine engines. The outputs of both engines are connected to drive a main rotor of the helicopter via a reduction gearbox. Each of the engines is sized to account for a worst-case scenario of the other engine failing during take-off. Accordingly, the power rating of each engine is significantly greater than what is required for cruising.

During a cruise operating regime (phase of flight), operating only one of the two engines at a relatively high power regime instead of both engines at a lower power regime can provide better fuel efficiency. However, once a turboshaft engine is stopped, there is an amount of time required to restart the engine and have the engine running at a sufficient output power level to make up for a possible power drop of the other engine. Even though only one of the two engines may be required during the cruise operating regime, it is typically required for safety reasons that both engines remain operating at all times during flight. Accordingly, in an emergency condition such as a power drop in one of the two engines, this allows the other engine to rapidly increase its power output to provide power to make up for the power loss. However, having both engines operating at all times during flight can limit the gains in fuel efficiency. Improvement is desirable.

SUMMARY

In one aspect, there is provided a method of operating a gas turbine engine of an aircraft. The method comprises:
 receiving fuel;
 supplying a first portion of the fuel to a combustor of the gas turbine engine via a first fuel manifold;
 supplying a second portion of the fuel to the combustor of the gas turbine engine via a second fuel manifold;
 supplying a third portion of the fuel to a reservoir;
 stopping fuel supply to the combustor via the first and second fuel manifolds, the first fuel manifold containing first residual fuel and the second fuel manifold containing second residual fuel; and
 after stopping fuel supply to the combustor via the first and second fuel manifolds:
  receiving the second residual fuel purged from the second fuel manifold into the reservoir;
  driving the third portion of the fuel out of the reservoir and using the third portion of the fuel to drive a Venturi pump; and
  using the Venturi pump to drive the first residual fuel in the first fuel manifold upstream and purge the first fuel manifold of the first residual fuel.

In another aspect, there is provided a method of operating a gas turbine engine of an aircraft. The method comprises:
 receiving fuel;
 supplying a first portion of the fuel to a combustor of the gas turbine engine via a first valve and a first fuel manifold;
 supplying a second portion of the fuel to the combustor of the gas turbine engine via a second valve and a second fuel manifold;
 supplying a third portion of the fuel to a first reservoir chamber of a reservoir via the second valve, the reservoir including a movable piston dividing the reservoir into the first reservoir chamber and a second reservoir chamber;
 stopping fuel supply to the combustor via the second valve and the second fuel manifold, the second fuel manifold containing residual fuel; and
 after stopping fuel supply to the combustor via the second fuel manifold:
  receiving the residual fuel purged from the second fuel manifold into the second reservoir chamber; and
  using the piston to drive the third portion of the fuel out of the first reservoir chamber and toward an outlet via the second valve.

In a further aspect, there is provided a fuel system of a gas turbine engine. The fuel system comprises:
 a first fuel manifold fluidly connectable to a combustor of the gas turbine engine;
 a second fuel manifold fluidly connectable to the combustor;
 a valve operatively disposed between the second fuel manifold and a fuel supply line for controlling fuel supply to the second fuel manifold; and
 a reservoir including a movable piston disposed therein and dividing the reservoir into a first reservoir chamber and a second reservoir chamber, the first reservoir chamber being fluidly connectable to the fuel supply line via the valve, the first reservoir chamber being fluidly connectable to a fuel purge line via the valve, the second reservoir chamber being in fluid communication with the second fuel manifold.

DESCRIPTION OF THE DRAWINGS

Reference is now made to the accompanying figures in which.

DETAILED DESCRIPTION

Figure 1:
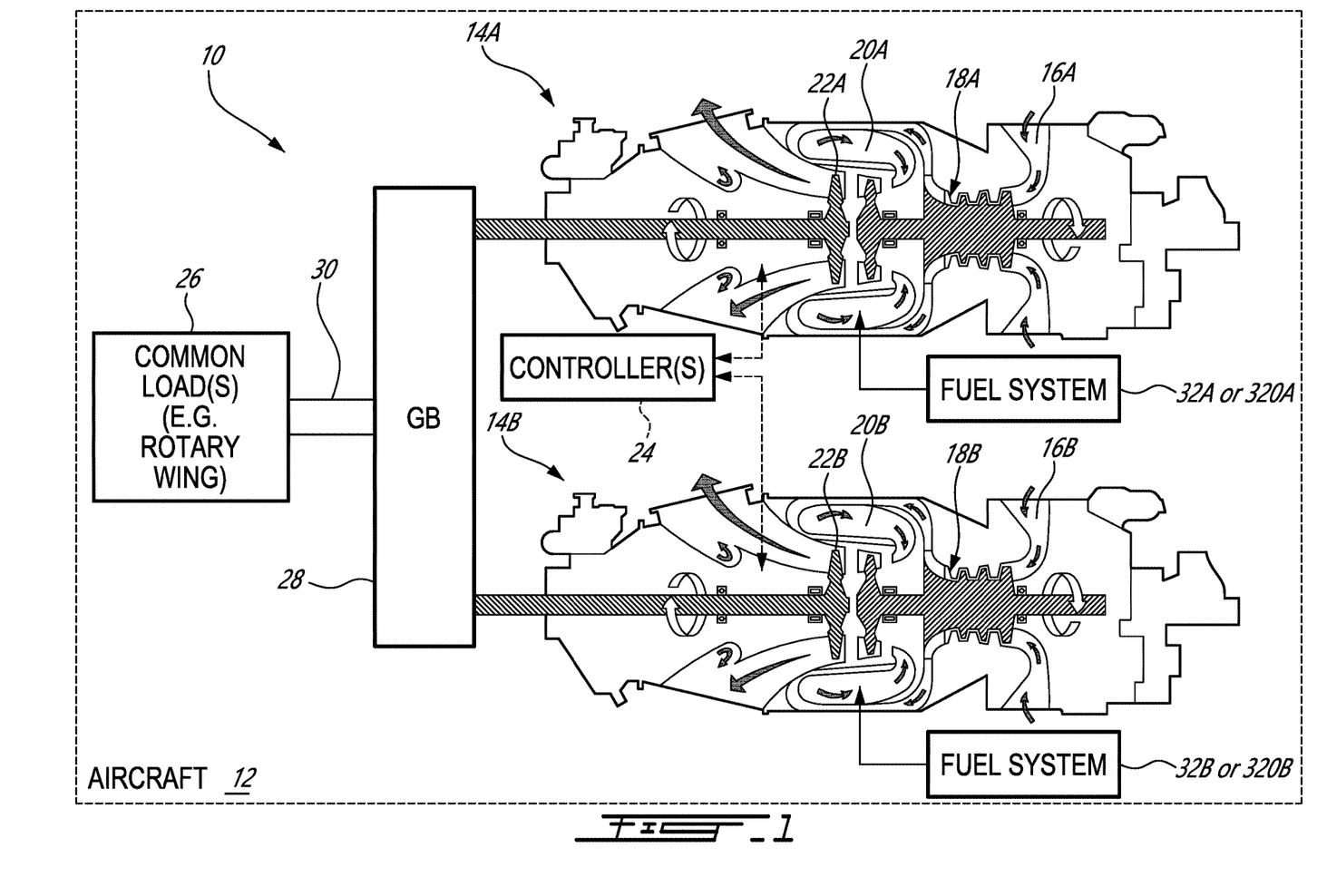
FIG. 1 is a schematic representation of an exemplary multi-engine (e.g., twin-pack) power plant for an aircraft.

FIG. 1 schematically illustrates an exemplary multi-engine (e.g., twin-pack) power plant 10 that may be used for an aircraft 12, which may be a rotorcraft such as a helicopter. Multi-engine power plant 10 may include two or more gas turbine engines (GTE) 14A, 14B. First gas turbine engine 14A is referred hereinafter as "FGTE 14A" and second gas turbine engine 14B is referred hereinafter as "SGTE 14B". In some instances FTGE 14A and/or SGTE 14B may be referred to generically as GTE 14 or GTEs 14A, 14B. In case of a helicopter application, these GTEs 14A, 14B may be turboshaft engines. However, it is understood that methods, systems and components disclosed herein are applicable to other types of aircraft engines such as turbofans and turboprops for example.

FIG. 1 shows axial cross-section views of two exemplary GTEs 14A, 14B of the turboshaft type. Each of GTEs 14A, 14B may comprise, in serial flow communication, air intake 16A, 16B through which ambient air is received, multistage compressor section 18A, 18B (referred generically as "compressor section 18") for pressurizing the air, combustor 20A, 20B (referred generically as "combustor 20") in which the pressurized air is mixed with fuel and ignited for generating an annular stream of hot combustion gases, and one or more turbines 22A, 22B for extracting energy from the combustion gases. In some embodiments, GTEs 14A, 14B may be of the same type and power output rating.

Control of multi-engine power plant 10 may be effected by one or more controller(s) 24, which may be full authority digital engine controller(s) (FADEC(s)), electronic engine controller(s) (EEC(s)), or the like, that is/are programmed to manage, as described herein below, the operation of GTEs 14A, 14B to reduce an overall fuel burn, particularly during sustained cruise operating regimes, where aircraft 12 is operated at a sustained (steady-state) cruising speed and altitude. The cruise operating regime is typically associated with the operation of prior art engines at equivalent part-power, such that each engine contributes approximately equally to the output power of power plant 10. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions (cruise speed and altitude) are substantially stable, GTEs 14A, 14B of power plant 10 may be operated asymmetrically, with one engine operated in a high-power "active" mode and the other engine operated in a low power (which could be no power, in some cases) "standby" mode. Doing so may provide fuel saving opportunities to aircraft 12, however there may be other suitable reasons why GTEs 14A, 14B are desired to be operated asymmetrically. This operation management may therefore be referred to as an "asymmetric mode" or an "asymmetric operating regime", wherein one of the two GTEs 14A, 14B is operated in a low power (which could be no power, in some cases) "standby mode" while the other FGTE 14A or SGTE 14B is operated in a high-power "active" mode. In such an asymmetric operation, which is engaged for a cruise operating regime (continuous, steady-state flight which is typically at a given commanded constant aircraft cruising speed and altitude).

Multi-engine power plant 10 may be used in an aircraft, such as a helicopter, but also has applications in suitable marine and/or industrial applications or other ground operations.

Referring still to FIG. 1, according to the present description, multi-engine power plant 10 is driving, in this example, a helicopter and may be operated in this asymmetric manner, in which a first of GTEs 14 (say, 14A) may be operated at high power in an active mode and the second of the GTEs 14 (14B in this example) may be operated in a low power (which could be no power, in some cases) standby mode. In one example, FGTE 14A may be controlled by controller(s) 24 to run at full (or near-full) power conditions in the active mode, to supply substantially all or all of a required power and/or speed demand of common load 26, which may be a rotary wing such as a main rotor of a helicopter or a propeller for example. GTEs 14A, 14B may be drivingly coupled to common load 26 via (e.g., speed-reduction) gearbox 28 and output shaft 30.

SGTE 14B may be controlled by controller(s) 24 to operate at low power or no-output-power conditions to supply substantially none or none of a required power and/or speed demand of common load 26. Optionally, a clutch may be provided to declutch the low-power standby SGTE 14B. Controller(s) 24 may control the engine's governing on power according to an appropriate schedule or control regime. Controller(s) 24 may comprise a first controller for controlling FGTE 14A and a second controller for controlling SGTE 14B. The first controller and the second controller may be in communication with each other in order to implement the operations described herein. In some embodiments, a single controller 24 may be used for controlling FGTE 14A and SGTE 14B.

In another example, an asymmetric operating regime of GTEs 14A, 14B may be achieved through controller's 24 differential control of fuel flow to GTEs 14A, 14B, as described in U.S. Patent Publication no. US 2020/0049025 A1 titled "MULTI-ENGINE SYSTEM AND METHOD", the entire contents of which are incorporated herein by reference. Low fuel flow may also include zero fuel flow in some examples.

Although various differential control between GTEs 14A, 14B of multi-engine power plant 10 are possible, in one particular embodiment controller(s) 24 may correspondingly control fuel flow rate to each GTE 14A, 14B accordingly. In the case of the standby SGTE 14B, a fuel flow (and/or a fuel flow rate) provided to the standby SGTE 14B may be controlled to be between 70% and 99.5% less than the fuel flow (and/or the fuel flow rate) provided to the active FGTE 14A. In the asymmetric mode, the standby SGTE 14B may be maintained between 70% and 99.5% less than the fuel flow to the active FGTE 14A. In some embodiments of the systems and methods disclosed herein, the fuel flow rate difference between the active and standby GTEs 14A, 14B may be controlled to be in a range of 70% and 90% of each other, with fuel flow to the standby SGTE 14B being 70% to 90% less than the active FGTE 14A. In some embodiments, the fuel flow rate difference may be controlled to be in a range of 80% and 90%, with fuel flow to the standby SGTE 14B being 80% to 90% less than the active FGTE 14A.

In another embodiment, controller(s) 24 may operate one engine (say SGTE 14B) of multi-engine power plant 10 in a standby mode at a power substantially lower than a rated cruise power level of SGTE 14B, and in some embodiments at substantially zero output power and in other embodiments less than 10% output power relative to a reference power (provided at a reference fuel flow). Alternately still, in some embodiments, controller(s) 24 may control the standby SGTE 14B to operate at a power in a range of 0% to 1% of a rated full-power of the standby SGTE 14B (i.e. the power output of the standby SGTE 14B to common gearbox 28 remains between 0% to 1% of a rated full-power of the standby SGTE 14B when the standby SGTE 14B is operating in the standby mode).

In another example, multi-engine power plant 10 of FIG. 1 may be operated in an asymmetric operating regime by control of the relative speed of GTEs 14A, 14B using controller(s) 24, that is, the standby SGTE 14B is controlled to a target low speed and the active FGTE 14A is controlled to a target high speed. Such a low speed operation of the standby SGTE 14B may include, for example, a rotational speed that is less than a typical ground idle speed of the engine (i.e. a "sub-idle" engine speed). Still other control regimes may be available for operating GTEs 14A, 14B in the asymmetric operating regime, such as control based on a target pressure ratio, or other suitable control parameters.

Although the examples described herein illustrate two GTEs 14A, 14B, asymmetric mode is applicable to more than two engines, whereby at least one of the multiple engines is operated in a low-power standby mode while the remaining engines are operated in the active mode to supply all or substantially all of a required power and/or speed demand of a common load.

In use, the first turboshaft engine (say FTGE 14A) may operate in the active mode while the other turboshaft engine (say SGTE 14B) may operate in the standby mode, as described above. During this asymmetric operation, if the helicopter needs a power increase (expected or otherwise), SGTE 14B may be required to provide more power relative to the low power conditions of the standby mode, and possibly return immediately to a high- or full-power condition. This may occur, for example, in an emergency condition of multi-engine power plant 10 powering the helicopter, wherein the active engine loses power and transitioning the standby engine from the low power condition to the high power condition may occur rapidly. Even absent an emergency, it may be desirable to repower the standby engine to exit the asymmetric mode.

During the low power (standby) operation or shutdown of GTE 14, fuel flow rates through one or more fuel manifolds feeding fuel to fuel nozzles of GTE 14 may need to be lowered significantly or stopped. If sufficiently low or stopped, residual or slow flowing fuel in the respective fuel manifolds and nozzles may form soot due to exposure to high combustor temperatures or direct combustion. Such type of soot formation is called coking and can degrade performance of the nozzles and fuel manifolds by clogging fuel flow pathways with carbon deposits over time. One or both of GTEs 14A, 14B may include fuel system 32A, 32B (referred generically below as "fuel system 32") or fuel system 320A, 320B (referred generically below as "fuel system 320") that is configured to mitigate and/or hinder such coking. Various embodiments of such fuel system 32, associated methods and components are described herein.

Figure 2:
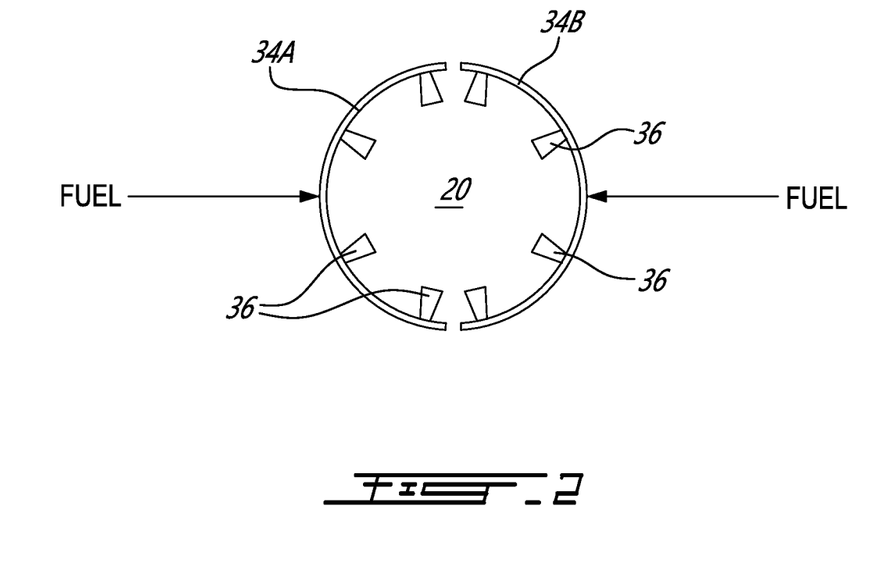
FIG. 2 is a schematic representation of exemplary fuel manifolds fluidly connected to a combustor of a gas turbine engine of the multi-engine power plant of FIG. 1.

FIG. 2 is a schematic representation illustrating an exemplary combustor 20 of GTE 14 in conjunction with two fuel manifolds 34A, 34B (referred generically herein as "fuel manifold 34") of fuel system 32, with associated respective fuel nozzles 36. In some embodiments, more than two fuel manifolds 34 may be configured to supply fuel to combustor 20. Depending on the mode of operation of GTE 14, fuel may be delivered to combustor 20 via only one fuel manifold 34A or 34B, or via both fuel manifolds 34A and 34B.

When one SGTE 14B is operated in a low-power standby mode (e.g., during flight) while the other FGTE 14A drives load 26, it may be desirable to supply fuel only to some but not all fuel manifolds 34 of SGTE 14B in order to maintain the low-power standby mode of operation of SGTE 14B while fuel flow to other fuel manifold(s) 34 of SGTE 14B is stopped to reduce the risk of coking. In order to further reduce the risk of coking during low-power operation of SGTE 14B, the deactivated fuel manifold(s) 34 of SGTE 14B may also be purged of residual fuel. During a shutdown sequence of SGTE 14B, it may also be desirable to purge both (or all) fuel manifolds 34A, 34B of SGTE 14B of residual fuel after fuel flow to fuel manifolds 34 has been stopped to further reduce the risk of coking.

Figure 3:
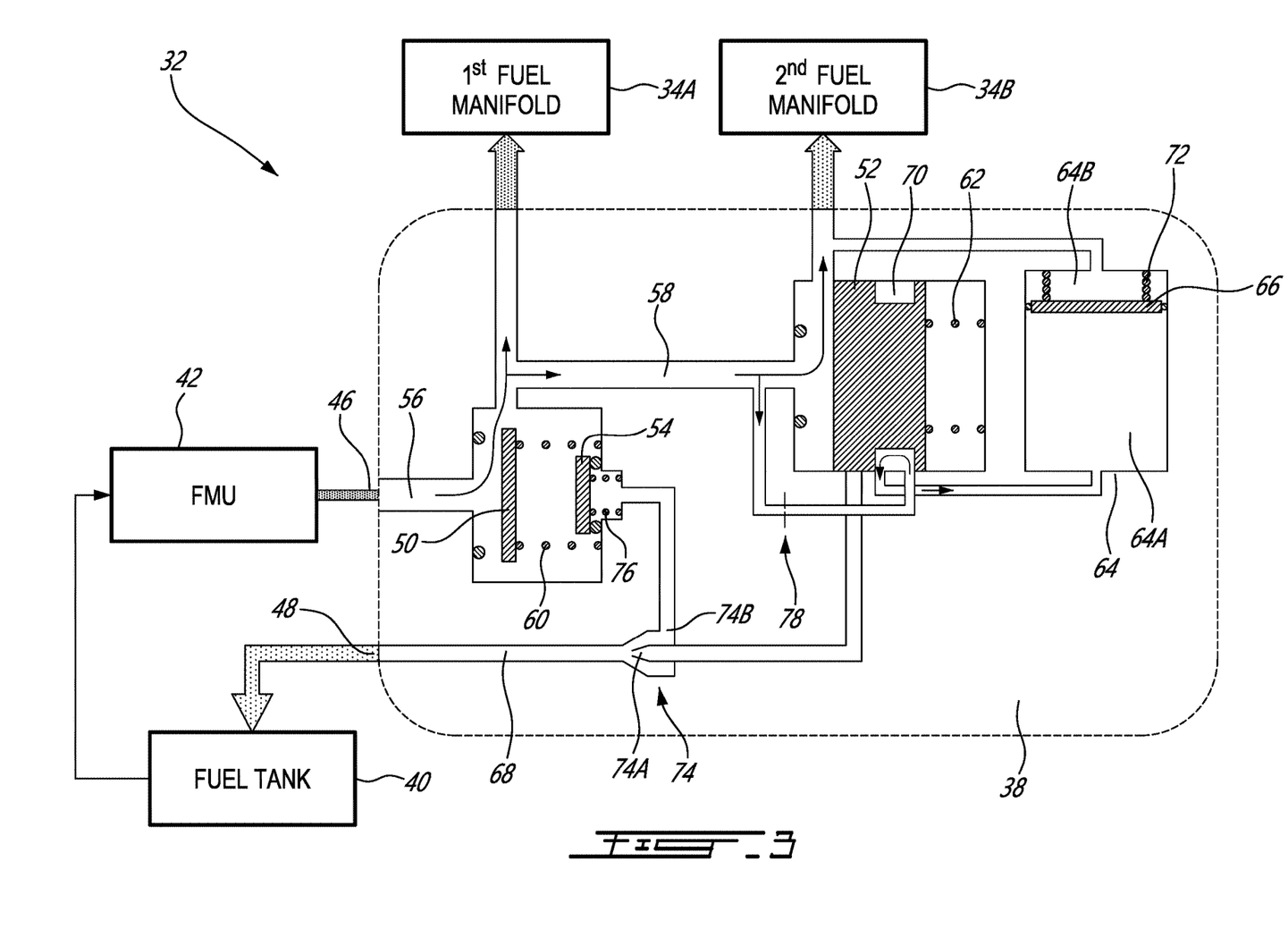
FIG. 3 is a schematic representation of an exemplary fuel system of a gas turbine engine of the multi-engine power plant of FIG. 1, in a first configuration.

FIG. 3 is a schematic representation of an exemplary fuel system 32 of GTE 14 of multi-engine power plant 10 of FIG. 1, in a first configuration. Fuel system 32 may include first fuel manifold 34A, second fuel manifold 34B, and flow divider assembly 38 (referred hereinafter as "FDA 38") configured to control fuel flow to first and second fuel manifolds 34A, 34B. First and second fuel manifolds 34A, 34B may be fluidly connectable to combustor 20 as shown in FIG. 2. Fuel may be supplied to FDA 38 from fuel tank 40 or other source via fuel metering unit 42 (referred below as "FMU 42"). FMU 42 may serve to variably adjust the fuel quantity delivered to FDA 38. FMU 42 may be operationally connected to controller(s) 24 and controlled by controller(s) 24 to adjust the fuel flow to FDA 38 based on the mode of operation of GTE 14. Fuel system 32 may also include one of more fuel pumps (not shown) for driving fuel from fuel tank 40 to FDA 38 via FMU 42. FDA 38 may receive metered fuel flow from FMU 42 and separate the metered fuel flow into separate flows to two or more fuel manifolds 34 to supply the fuel to combustor 20 of GTE 14. FDA 38 may be configured as an assembly that is replaceable as a unit in GTE 14. For example, the components of FDA 38 may be assembled on a common platform to define a module replaceable as a line replaceable unit (LRU) in GTE 14. Alternatively, some or all components shown as being part of FDA 38 may be standalone components that are separately assembled in the configuration shown. For example, reservoir 64 may be incorporated in FDA 38, FMU 42 or may be integrated in fuel system 32 as a standalone component.

FDA 38 may include fuel inlet 46 for receiving fuel from FMU 42 and ecology outlet 48 for returning some fuel that has not been consumed by combustor 20 to a low-pressure destination such as back to fuel tank 40 for example where the fuel can eventually be returned to FMU 42. FDA 38 may include first flow valve 50 and second flow valve 52 for controlling fuel flow to first and second fuel manifolds 34A, 34B. FDA 38 may also include purge valve 54 to permit reverse purging of residual fuel from first fuel manifold 34A during shutdown of GTE 14. First and second flow valves 50, 52, and also purge valve 54 may be spool type valves or other suitable types of valves. First and second flow valves 50, 52 may be fuel scheduling valves that control the metered fuel flow to first and second fuel manifolds 34A, 34B. First and second flow valves 50, 52, and purge valve 54 may be pressure-actuate hydraulic valves that are actuated by the pressure and/or flow of metered fuel supplied to FDA 38. It is understood that other types of valves including electrically-controlled flow valves could instead be used.

First and second flow valves 50, 52 may be disposed in series so that first flow valve 50 may control fuel flow to first fuel manifold 34A and also fuel flow to second flow valve 52. First flow valve 50 may be in fluid communication with fuel inlet 46 via first fuel supply line 56. Second flow valve 52 may be in fluid communication with first flow valve 50 via second fuel supply line 58. First flow valve 50 may include a movable valve body disposed within a valve housing. First flow valve 50 may be resiliently biased (e.g., by spring 60) toward a closed position wherein fuel flow to first and second fuel manifolds 34A, 34B is substantially prevented. Second flow valve 52 may also include a movable valve body disposed within a valve housing. Second flow valve 52 may be resiliently biased (e.g., by spring 62) toward a closed position wherein fuel flow to second fuel manifold 34B is substantially prevented.

First and second flow valves 50, 52 may have different cracking (opening) points (e.g., pressures and/or flows). For example, the cracking pressure and/or flow of second flow valve 52 may be greater than the cracking pressure and/or flow of first flow valve 50. Accordingly, fuel delivery to first and second fuel manifolds 34A, 34B may be sequenced appropriately during starting of GTE 14, during shutdown of GTE 14 and also during the transition from a high-power mode of operation to a low-power mode of operation for example.

During engine start for example, as fuel pressure and flow delivered by FMU 42 to FDA 38 is increased (e.g., to increase the power output of GTE 14) beyond the cracking point of first flow valve 50, first flow valve 50 may be caused to move (toward the right in FIG. 3) against the biasing force of (e.g., coil, helical) spring 60 and start supplying fuel to first fuel manifold 34A. At this stage, purge valve 54 is also exposed to the fuel pressure and is urged to its closed position to prevent fuel from leaking to purge line 68. As the fuel pressure and flow delivered by FMU 42 is further increased, first flow valve 50 may be caused to open wider and allow more fuel toward first fuel manifold 34A and also toward second flow valve 52 via second fuel supply line 58. Once the fuel pressure and/or flow at second flow valve 52 reaches and exceeds the cracking point of second flow valve 52, second flow valve 52 may be caused to move (toward the right in FIG. 3) against the biasing force of (e.g., coil, helical) spring 62 and start supplying fuel to second fuel manifold 34B.

On the other hand, during engine shutdown or a transition from a high-power mode of operation to a low power mode of operation, as fuel pressure and flow delivered by FMU 42 is decreased (e.g., to reduce the power output of GTE 14), second flow valve 52 may be caused to move (toward the left in FIG. 3) under the influence of the biasing force of spring 62 overcoming the fuel pressure and reduce fuel supply to second fuel manifold 34B. As the fuel pressure and/or flow at second flow valve 52 is reduced below the reseat or reclosing point of second flow valve 52, second flow valve 52 may become closed to substantially prevent fuel flow to second fuel manifold 34B. Fuel supply to first fuel manifold 34A may be continued while fuel supply to second fuel manifold 34B is stopped during a low-power mode of operation.

As fuel pressure and flow delivered by FMU 42 is further decreased, first flow valve 50 may be caused to move (toward the left in FIG. 3) under the influence of the biasing force of spring 60 and reduce fuel supply to first fuel manifold 34A. As the fuel pressure at first flow valve 50 is reduced below the reseat point of first flow valve 50 during shutdown of GTE 14 for example, first flow valve 50 may become closed to substantially prevent fuel flow to first fuel manifold 34A. In other words, the series arrangement of first flow valve 50 and second valve 52 in combination with the different cracking and reseat points may allow for the initiation and/or stopping of fuel flow to first and second fuel manifolds 34A, 34B to be sequenced accordingly for different modes of operation of GTE 14.

FDA 38 may be capable of positively sealing first and second fuel manifolds 34A, 34B from one another to avoid or limit fuel leakages from an active (e.g., fuel-flowing) manifold to an inactive and purged manifold to keep the inactive manifold(s) empty of fuel during some engine operating mode(s) including during flight. Sealing functions of FDA 38 may be achieved using soft valve seats, hard valve seats, dynamic seals, air seals, other types of seals and/or by using any combinations of the foregoing. Such sealing devices may interact with or be part of first flow valve 50, second flow valve 52, purge valve 54 and/or piston 66.

Fuel system 32 may also include reservoir 64 including movable piston 66 disposed therein and sealingly dividing reservoir 64 into first chamber 64A and second chamber 64B. Reservoir 64 may be part of FDA 38. The sizes of first chamber 64A and of second chamber 64B may be variable by way of movement of piston 66. First chamber 64A may be fluidly connectable to second fuel supply line 58 leading to second flow valve 52. First chamber 64A may also be fluidly connectable to fuel purge line 68 leading to ecology outlet 48. Fluid connections between first chamber 64A and either second fuel supply line 58 or fuel purge line 68 may be achieved via passage 70 formed in the body of second flow valve 52. Passage 70 may include a circumferential groove machined or otherwise formed in second flow valve 52. Second chamber 64B may be in fluid communication with second fuel manifold 34B. Piston 66 may be movable between a manifold-active position shown in FIG. 3, and a manifold-inactive position shown in FIG. 4. Piston 66 may be resiliently biased toward the manifold-inactive position that causes the contraction of first chamber 64A and the expansion of second chamber 64B by way of (e.g., coil, helical) spring 72 shown in a compressed state in FIG. 3. Alternatively or in addition, piston 66 may be actively controlled by controller(s) 24 (shown in FIG. 1) using a suitable electromechanical actuator for example and be caused to move at desired rates for different modes of operation of GTE 14.

Fuel system 32 may also include optional Venturi pump 74 disposed in fuel purge line 68. In various embodiments, Venturi pump 74 may be an ejector, an eductor, or any other type of pump that is driven by the Venturi effect. Venturi pump 74 may also be referred to as a Venturi-effect pump. Venturi pump 74 may be any device that uses the energy of a motive fluid to entrain another fluid. Venturi pump 74 may include a motive fluid nozzle 74A connected to receive fuel from first chamber 64A therethrough as a motive fluid. Venturi pump 74 may also include inlet 74B connected to receive residual fuel from first fuel manifold 34A via purge valve 54. In other words, first fuel manifold 34A may be fluidly connectable to fuel purge line 68 via purge valve 54 when reverse purging of first fuel manifold 34A is performed. As explained below, Venturi pump 74 may assist in purging first fuel manifold 34A of residual fuel during a shutdown of GTE 14.

Purge valve 54 may be resiliently biased (e.g., by way of spring 76) toward an open position that establishes fluid communication between first fuel manifold 34A and purge line 68. When first flow valve 50 is open as shown in FIG. 3, fuel pressure urges purge valve 54 toward its closed position by causing compression of (e.g., coil, helical) spring 76 and thereby substantially preventing the leakage of fuel intended to be supplied to first and/or second fuel manifolds 34A, 34B to fuel purge line 68.

FIG. 3 schematically illustrates a configuration of FDA 38 where both flow valves 50, 52 are open so as to supply fuel to both fuel manifolds 34A, 34B. The configuration of FIG. 3 may correspond to a situation where GTE 14 is operated at a relatively high-power condition. In this configuration, purge valve 54 may be closed. In this configuration, fluid communication may be established between first chamber 64A of reservoir 64 and second fuel supply line 58 via passage 70 formed in second flow valve 52 due to the position of second flow valve 52 as shown by arrows in FIG. 3. The exposure of first chamber 64A to the fuel pressure upstream of second flow valve 52 may cause piston 66 to overcome the force provided by spring 72 and the pressure inside of second chamber 64B, and move toward the manifold-active position. At the manifold-active position of piston 66, first chamber 64A may be relatively large and substantially filled with fuel, and, second chamber 64B may be relatively small.

FIG. 3 also shows an optional flow restrictor 78 fluidly disposed between first chamber 64A and second fuel supply line 58. Flow restrictor 78 may include an orifice calibrated to limit a movement speed of piston 66 when fuel is received into first chamber 64A. For example, flow restrictor 78 may consequently limit a flow rate of fuel delivered from second chamber 64B to second fuel manifold 34B during the activation of second fuel manifold 34B. In some situations, flow restrictor 78 may prevent the delivery of a fuel spike to combustor 20 via second fuel manifold 34B from second chamber 64B when second fuel manifold 34B is activated by the opening movement of second flow valve 52. The position of second flow valve 52 in FIG. 3 may prevent the delivery of fuel to purge line 68 via motive fluid nozzle 74A. The closed position of purge valve 54 may also prevent the delivery of fuel to purge line 68 via inlet 74B of Venturi pump 74.

Figure 4:
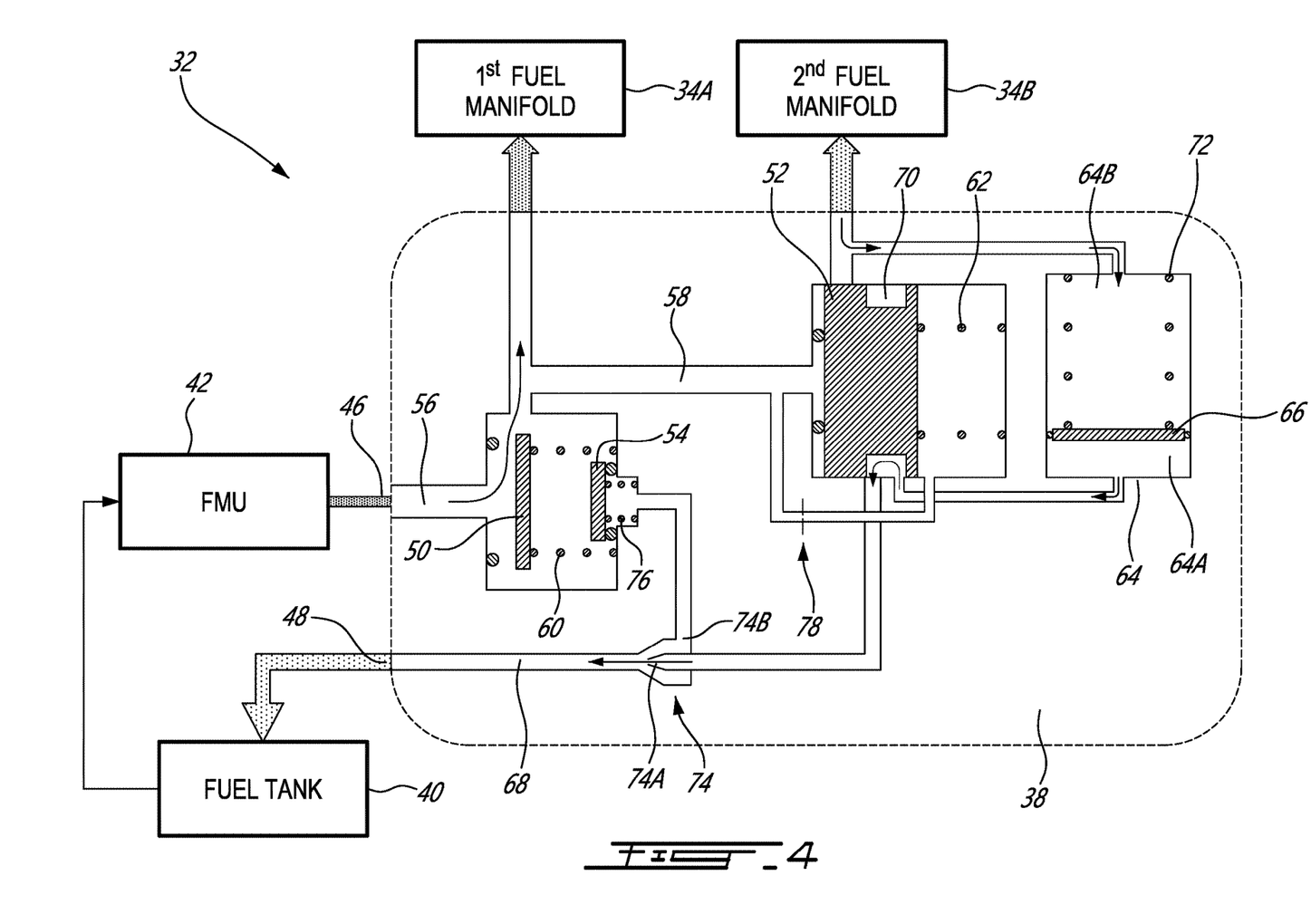
FIG. 4 is a schematic representation of the fuel system of FIG. 3 in a second configuration.

FIG. 4 is a schematic representation of fuel system 32 in a second configuration where first flow valve 50 is open and second flow valve 52 is closed so that fuel is supplied to first fuel manifold 34A but not to second fuel manifold 34B. The configuration of FIG. 4 may correspond to a situation where GTE 14 has transitioned to a sustained low-power operating condition that requires the use of first fuel manifold 34A but not the use of second fuel manifold 34B. Further description of the operation of FDA 38 in the configurations shown in FIGS. 3 and 4 is provided below in relation to method 500.

Figure 5:
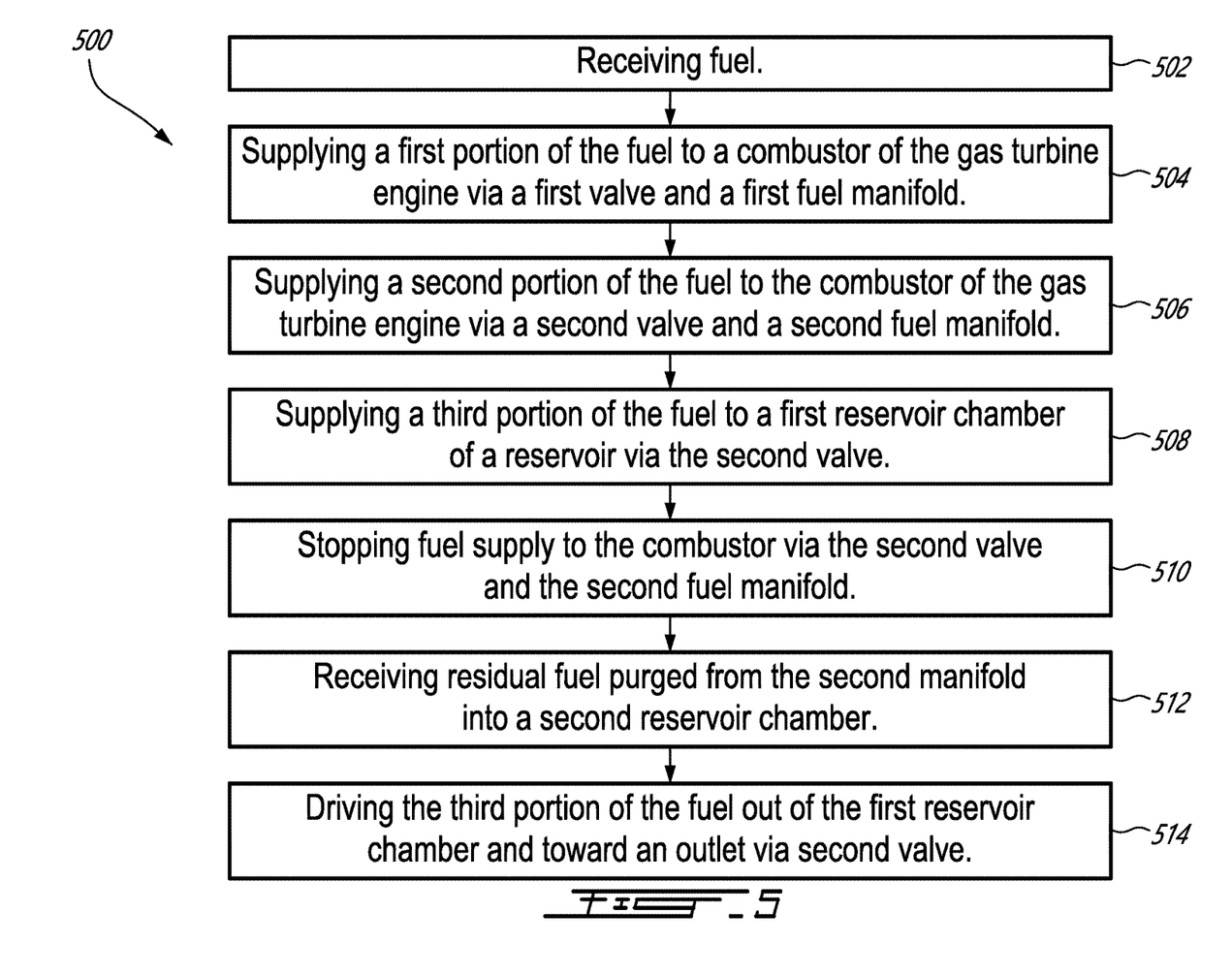
FIG. 5 is a flowchart of a method of operating a gas turbine engine.

FIG. 5 is a flowchart of method 500 of operating GTE 14. Method 500 may be performed using fuel system 32 described above or fuel system 320 described below. Aspects of method 500 may be combined with other methods described herein. Method 500 may be described in reference to FIGS. 3 and 4 and may include a transition from the configuration of FDA 38 shown in FIG. 3 to the configuration of FDA 38 shown in FIG. 4. In various embodiments, method 500 may include:

receiving fuel (e.g., via fuel inlet 46) (see block 502);
supplying a first portion of the fuel to combustor 20 of GTE 14 via first flow valve 50 and first fuel manifold 34A (see block 504);
supplying a second portion of the fuel to combustor 20 of GTE 14 via second flow valve 52 and second fuel manifold 34B (see block 506);
supplying a third portion of the fuel to first chamber 64A of reservoir 64 via second flow valve 52 (see block 508), reservoir 64 including movable piston 66 dividing reservoir 64 into first chamber 64A and second chamber 64B;
stopping fuel supply to combustor 20 via second flow valve 52 and second fuel manifold 34B (see block 510), second fuel manifold 34B containing residual fuel; and
after stopping fuel supply to combustor 20 via second fuel manifold 34B:
receiving the residual fuel purged from second fuel manifold 34B into second chamber 64B (see block 512); and
using piston 66 to drive the third portion of the fuel out of first reservoir chamber 64A and toward ecology outlet 48 via second flow valve 52 (see block 514).

In reference to FIGS. 3 and 4, second flow valve 52 may be movable between a first (closed) position shown in FIG. 4 and a second (open) position shown in FIG. 3. In the open position shown in FIG. 3, second flow valve 52 establishes fluid communication between second fuel manifold 34B and second fuel supply line 58. In the open position, second flow valve 52 also establishes fluid communication (e.g., via passage 70) between first reservoir chamber 64A and second fuel supply line 58. In the open position, second valve 52 also substantially prevents fluid communication between first chamber 64A of reservoir 64 and purge line 68. In the closed position of second flow valve 52 shown in FIG. 4, second flow valve 52 substantially prevents fluid communication between second fuel manifold 34B and second fuel supply line 58. In the closed position, second flow valve 52 also substantially prevents fluid communication between first chamber 64A of reservoir 64 and second fuel supply line 58. In the closed position, second flow valve 52 further establishes fluid communication (e.g., via passage 70) between first chamber 64A of reservoir 64 and fuel purge line 68.

When the pressure and/or flow of metered fuel supplied by FMU 42 is sufficiently lowered to cause closing of second flow valve 52 and stop fuel supply to second fuel manifold 34B, the residual fuel contained in second fuel manifold 34B may be purged to hinder coking. The residual fuel in second fuel manifold 34B may be purged in the reverse direction where, instead of the residual fuel being driven downstream into combustor 20, the residual fuel is driven upstream in the reverse direction and stored into second chamber 64B of reservoir 64. The residual fuel in second fuel manifold 34B may be driven in part by the positive pressure of gas inside of combustor 20. The residual fuel in second fuel manifold 34B may also be driven in part by spring 72 urging piston 66 toward the manifold-inactive position to cause expansion of second chamber 64B and thereby suction the residual fuel out of second fuel manifold 34B and into second chamber 64B. Second chamber 64B may be sized to store some or substantially all of the residual fuel in second fuel manifold 34B.

Receiving the residual fuel from second fuel manifold 34B into the second chamber 64B may occur while the first portion of the fuel is supplied to combustor 20 via first flow valve 50 and first fuel manifold 34A so that GTE 14 may continue to be operated while second fuel manifold 34B is deactivated. Since first flow valve 50 is open, purge valve 54 may be exposed to the fuel supply pressure and caused to remain closed so as to substantially prevent fuel flow toward fuel purge line 68 via purge valve 54. The flow of the third portion of fuel through the optional Venturi pump 74 while being expelled from first chamber 64A of reservoir 64 may create a low pressure zone behind purge valve 54 and further urge purge valve 54 toward its closed position to prevent purging of first fuel manifold 34A in the configuration of FIG. 4.

In some embodiments, method 500 may be carried out during flight of aircraft 12 wherein FDA 38 shown in FIGS. 3 and 4 is associated with SGTE 14B of multi-engine power plant 10 and SGTE 14B is transitioning to a low-power mode of operation while FGTE 14A may continue to operate at a relatively high-power mode of operation to drive load 26. During shutdown of GTE 14 after operating some time in the configuration of FDA of FIG. 4, pressurized gas (e.g., pressurized air generated by compressor section 18) inside combustor 20 and gravity may be used to drive residual fuel upstream and out of first fuel manifold 34A when first flow valve 50 is closed and purge valve 54 is open to allow the purged residual fuel toward ecology outlet 48.

Figure 6:
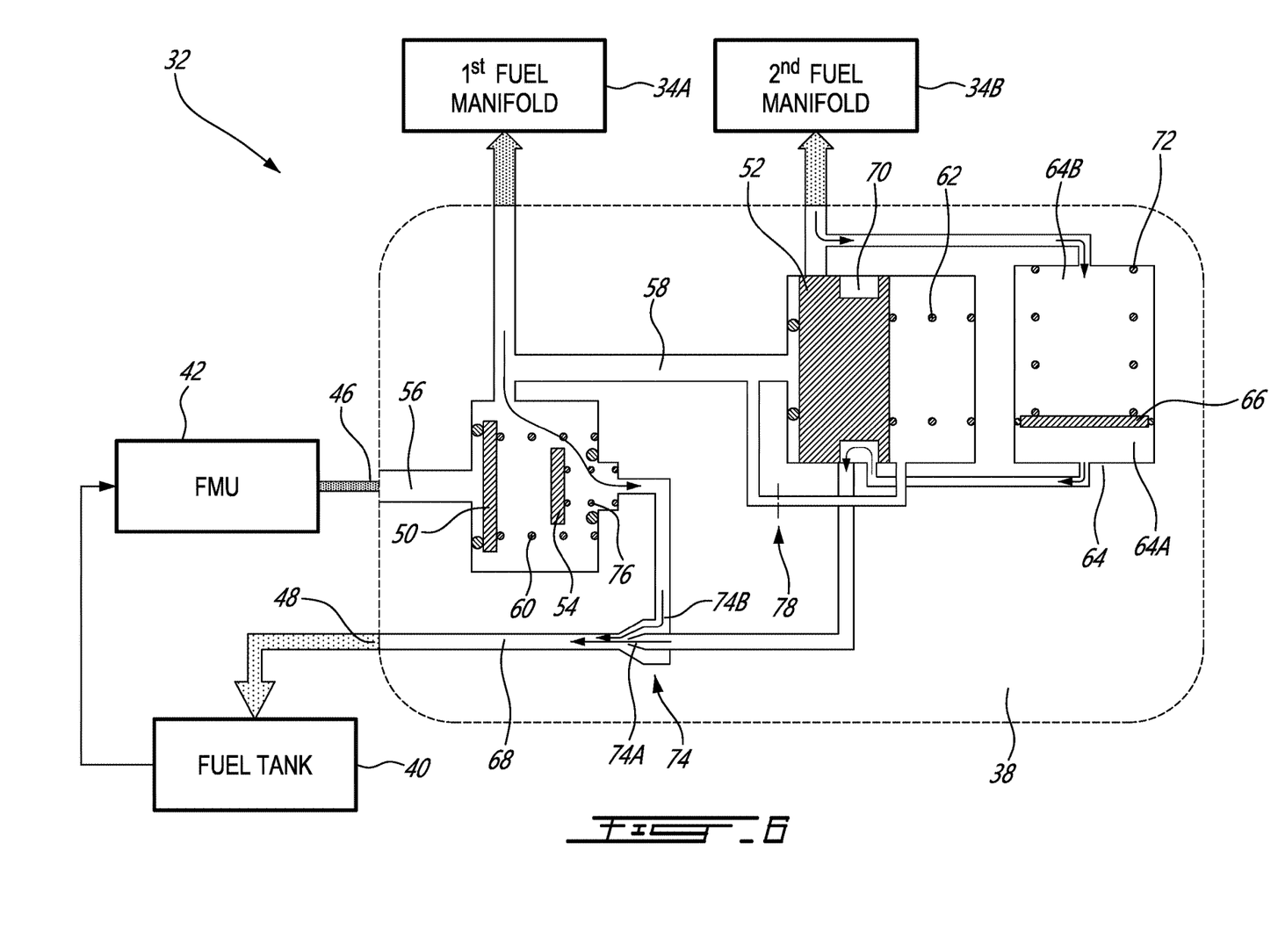
FIG. 6 is a schematic representation of the fuel system of FIG. 3 in a third configuration.

FIG. 6 is a schematic representation of the fuel system of FIG. 3 in a third configuration. The configuration of FDA 38 shown in FIG. 6 may be adopted during a shutdown of GTE 14 and may follow the configuration of FIG. 3. During shutdown of GTE 14, first and second flow valves 50, 52 may be closed substantially simultaneously, or, first flow valve 50 may be closed shortly after the closing of second flow valve 52. The configuration of FDA 38 of FIG. 6 shows reverse purging of both first fuel manifold 34A and second fuel manifold 34B. Further description of the operation of FDA 38 in the configuration shown in FIG. 6 is provided below in relation to method 700.

Figure 7:
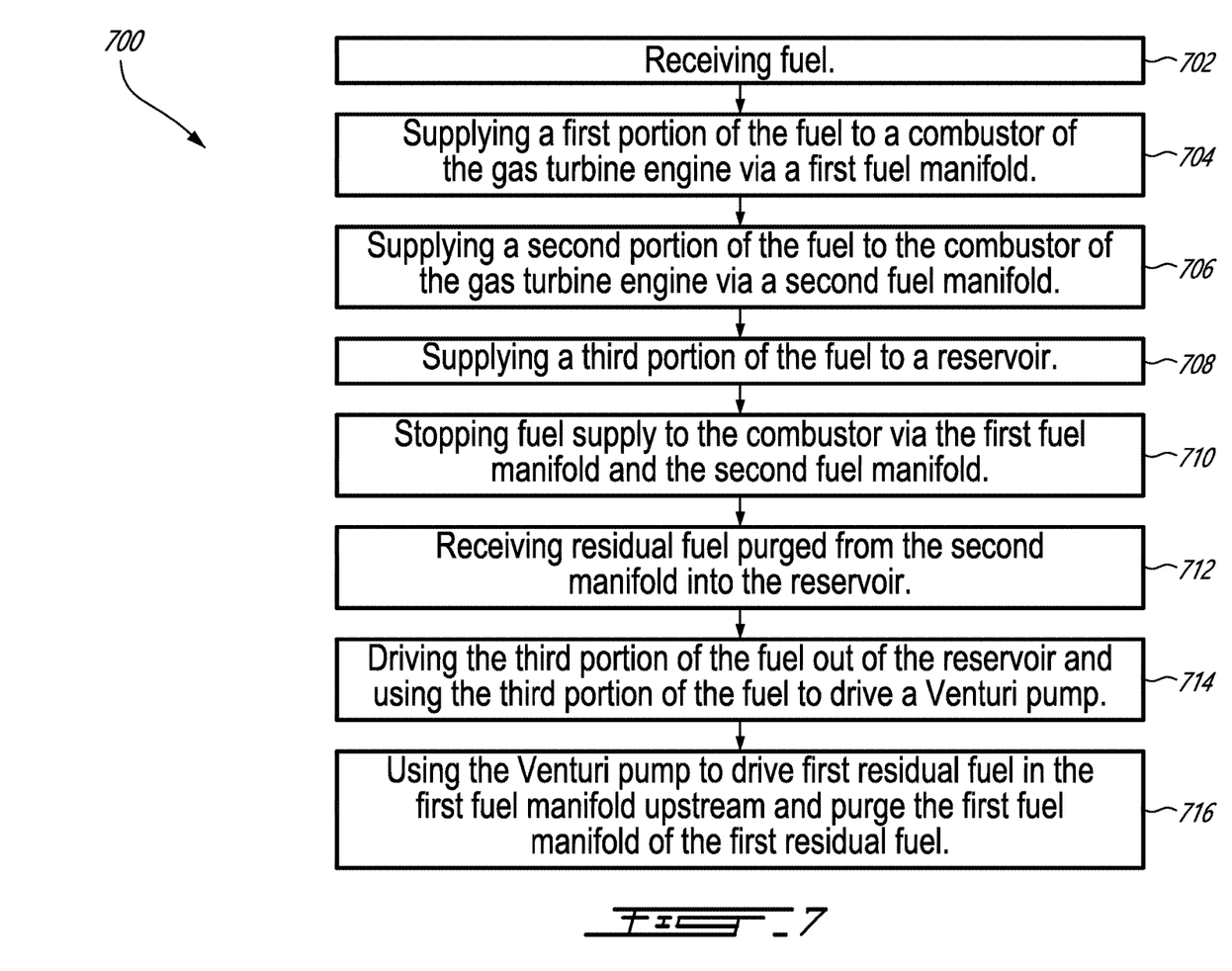
FIG. 7 is a flowchart of another method of operating a gas turbine engine.

FIG. 7 is a flowchart of method 700 of operating GTE 14. Method 700 may be performed using fuel system 32 described above or other fuel system. Aspects of method 700 may be combined with other methods described herein. Method 700 may be described in reference to FIGS. 3 and 6 and may include a transition from the configuration of FDA 38 shown in FIG. 3 to the configuration of FDA 38 shown in FIG. 6. In various embodiments, method 700 may include:

receiving fuel (e.g., via fuel inlet 46) (see block 702);
supplying a first portion of the fuel to combustor 20 of GTE 14 via first fuel manifold 34A (see block 704);
supplying a second portion of the fuel to combustor 20 of GTE 14 via second fuel manifold 34B (see block 706);
supplying a third portion of the fuel to reservoir 64 (see block 708);
stopping fuel supply to combustor 20 via first and second fuel manifolds 34A, 34B where first fuel manifold 34A contains first residual fuel and second fuel manifold 34B contains second residual fuel (see block 710); and
after stopping fuel supply to combustor 20 via first and second fuel manifolds 34A, 34B:
receiving the second residual fuel purged from second fuel manifold 34B into (e.g., second chamber 64B of) reservoir 64 (see block 712);
driving the third portion of the fuel out of (e.g., first chamber 64A of) reservoir 64 and using the third portion of the fuel to drive Venturi pump 74 (see block 714); and
using Venturi pump 74 to drive first residual fuel in first fuel manifold 34A upstream and purge first fuel manifold 34A of the first residual fuel (see block 716).

Method 700 may represent shutting down of GTE 14 from an operating condition where both first and second fuel manifolds 34A, 34B are supplied with fuel. Method 700 may include method 500 described above.

During method 700, piston 66 may move from the manifold-active position where first chamber 64A is expanded and second chamber 64B is contracted, to the manifold-inactive position where first chamber 64A is contracted and second chamber 64B is expanded. As the residual fuel from second fuel manifold 34B is received into second chamber 64B, the fuel inside of first chamber 64A is driven out of first chamber 64A and is driven toward purge line 68 via passage 70 formed in second flow valve 52. The closed position of second flow valve 52 establishes fuel communication between first chamber 64A and Venturi pump 74 via passage 70. In some situations, the driving of piston 66 toward the manifold-inactive position may be done by the positive pressure inside of combustor 20 pushing the residual fuel into second chamber 64B, and also by the extension of spring 72 urging piston 66 toward the manifold-inactive position. In some situations, spring 72 may urge piston 66 and cause expansion of second chamber 64B and help drive the residual fuel in second fuel manifold 34B upstream by way of suction and purge second fuel manifold 34B of residual fuel.

The residual fuel received from second fuel manifold 34B may be stored in second chamber 64B of reservoir 64 after shutdown of GTE 14 and also during a period of inactivity of GTE 14. During restarting of GTE 14 and resuming fuel supply to combustor 20 via second fuel manifold 34B, the residual fuel stored in second chamber 64B may be driven out of second chamber 64B and delivered to second fuel manifold 34B by the movement of piston 66 toward the manifold-active position as described above when fuel received into first chamber 64A causes compression of spring 72 and contraction of second chamber 64B.

Pressurized gas (e.g., pressurized air generated by compressor section 18) inside combustor 20 may be used to drive residual fuel upstream and out of first and second fuel manifolds 34A, 34B. However, in some embodiments, optional Venturi pump 74 may assist with the reverse purging of first fuel manifold 34A. For example, in reference to FIG. 6 fuel driven out of first chamber 64A by piston 66 may serve as a motive fluid flowing through motive fluid nozzle 74A of Venturi pump 74 and help purge residual fuel from first fuel manifold 34A. Since purge valve 54 may no longer be exposed to the fuel supply pressure from FMU 42 due to the closing of first flow valve 50, purge valve 54 may be urged open by spring 76 and thereby establish fluid communication between first fuel manifold 34A and purge line 68. The flow of fuel from first chamber 64A through motive fluid nozzle 74A of Venturi pump 74 may help entrain residual fuel from first fuel manifold 34A into purge line 68 and toward ecology outlet 48. Accordingly, the fuel being discharged from first chamber 64A of reservoir 64 may be combined with the residual fuel purged from first fuel manifold 34A at Venturi pump 74 and driven toward ecology outlet 48.

Figure 8:
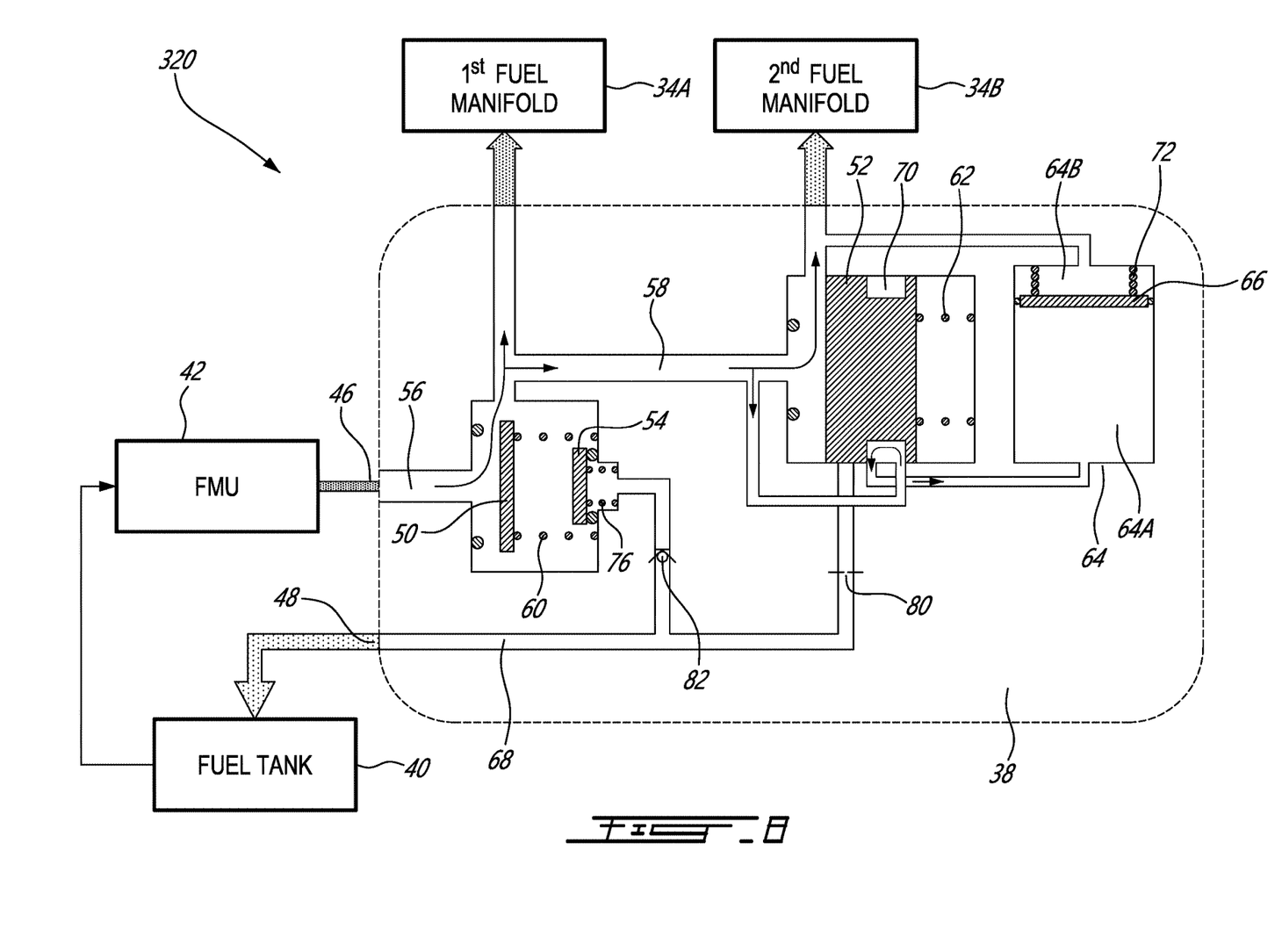
FIG. 8 is a schematic representation of another exemplary fuel system of the gas turbine engine of the multi-engine power plant of FIG. 1.

FIG. 8 is a schematic representation of another exemplary fuel system 320 of a GTE 14 of multi-engine power plant 10. Fuel system 320 may have elements in common with fuel system 32 described above. Like elements have been identified using like reference numerals and their descriptions are not repeated. As mentioned above, the positive pressure inside of combustor 20 and gravity may be sufficient to drive residual fuel out of first fuel manifold 34A during shut down. Accordingly, Venturi pump 74 may not be required in some embodiments where such supplemental entrainment of the residual fuel inside of first fuel manifold 34A is not required. Fuel system 320 may be capable of adopting the various configurations of fuel system 32 described above.

In contrast with fuel system 32, fuel system 320 may be devoid of Venturi pump 74. In some embodiments, fuel system 320 may also include optional flow restrictor 80 and check valve 82. Flow restrictor 80 may be operatively disposed between purge line 68 and first chamber 64A and downstream of passage 70 of second flow valve 52. Flow restrictor 80 may include an orifice calibrated to limit a flow rate of fuel driven from first chamber 64A to purge line 68 while piston 66 is moving toward the manifold-inactive position shown in FIG. 4. Check valve 82 (i.e., non-return valve or one-way valve) may be operatively disposed between purge valve 54 and purge line 68. Check valve 82 may be installed to prevent flow of fuel from purge line 68 back into first fuel manifold 34A.

Check valve 82 and one or more flow restrictors 80 may be used to prioritize the purging of second fuel manifold 34B over first fuel manifold 34A. However, the purging of first and second fuel manifolds 34A, 34B may be substantially independent of each other. The presence of flow restrictor 80 may also hinder the flow of residual fuel purged from first fuel manifold 34B toward second flow valve 52. The presence of restrictor 80 may also hinder the flow of fuel being discharged from first chamber 64A of reservoir 64 to prioritize the purging of first fuel manifold 34A over second fuel manifold 34B.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A fuel system of a gas turbine engine, the fuel system comprising:
    a first fuel manifold fluidly connectable to a combustor of the gas turbine engine;
    a second fuel manifold fluidly connectable to the combustor;
    a valve operatively disposed between the second fuel manifold and a fuel supply line for controlling fuel supply to the second fuel manifold; and
    a reservoir including a movable piston disposed therein and dividing the reservoir into a first reservoir chamber and a second reservoir chamber, the first reservoir chamber being fluidly connectable to the fuel supply line via the valve, the first reservoir chamber being fluidly connectable to a fuel purge line via the valve, the second reservoir chamber being in fluid communication with the second fuel manifold,
wherein:
    the valve is movable between a first position and a second position;
    in the first position of the valve:
        the valve substantially prevents fluid communication between the second fuel manifold and the fuel supply line;
        the valve substantially prevents fluid communication between the first reservoir chamber and the fuel supply line; and
        the valve establishes fluid communication between the first reservoir chamber and the fuel purge line;
    in the second position of the valve:
        the valve establishes fluid communication between the second fuel manifold and the fuel supply line;
        the valve establishes fluid communication between the first reservoir chamber and the fuel supply line; and
        the valve substantially prevents fluid communication between the first reservoir chamber and the fuel purge line; and
    the fuel system includes a Venturi pump disposed in the fuel purge line, the Venturi pump including a motive fluid nozzle connected to receive fuel from the first reservoir chamber therethrough, the Venturi pump including an inlet connected to receive fuel from the first fuel manifold.

2. The fuel system as defined in claim 1, wherein the fuel supply line establishes fluid communication between the first fuel manifold and the valve.

3. The fuel system as defined in claim 1, wherein the first fuel manifold is fluidly connectable to the fuel purge line.

* * * * *